July 7, 1970  J. K. DAVIS  3,519,357
OPHTHALMIC LENS DEMONSTRATING APPARATUS AND THE LIKE
Filed Aug. 23, 1965
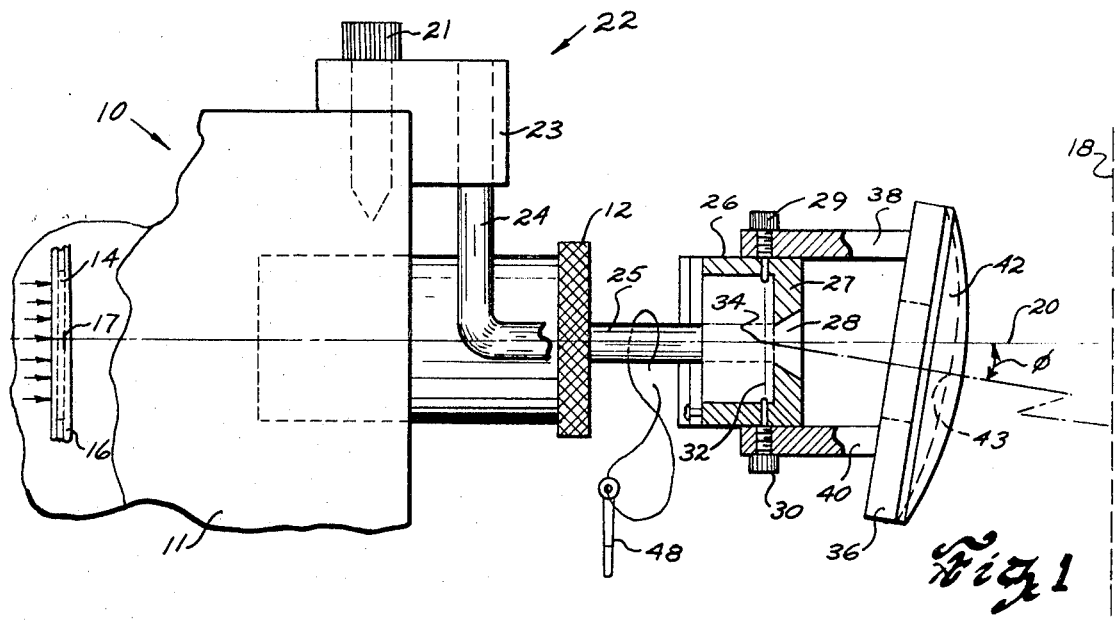
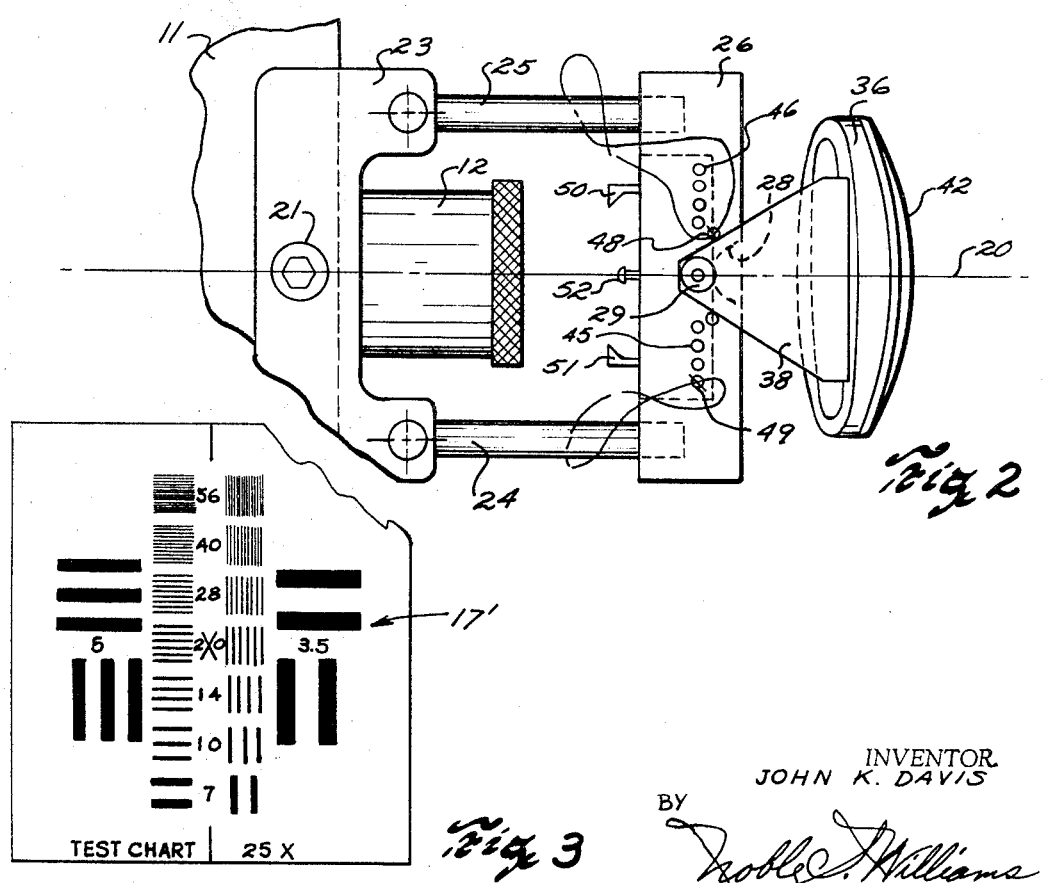
INVENTOR.
JOHN K. DAVIS
BY
ATTORNEY United States Patent Office 3,519,357
Patented July 7, 1970

3,519,357
OPHTHALMIC LENS DEMONSTRATING
APPARATUS AND THE LIKE
John K. Davis, East Woodstock, Conn., assignor, by mesne assignments, to American Optical Corporation, Southbridge, Mass., a corporation of Delaware
Filed Aug. 23, 1965, Ser. No. 481,553
Int. Cl. G01b 9/00; G03b 21/00
U.S. Cl. 356—124
6 Claims

ABSTRACT OF THE DISCLOSURE

Apparatus for visually displaying by enlarged projected test chart images the refractive characteristics of different ophthalmic lenses and also differences in different parts of a single ophthalmic lens including pivotal lens support means detachably secured forward of a projector.

---

This invention relates to apparatus for use in visually demonstrating refractive characteristics of ophthalmic lenses and the like. More particularly, the invention relates to ophthalmic lens-demonstrating apparatus and the like of such construction and arrangement as to readily receive individual ophthalmic lenses, preferably in an ordinary full size uncut unedged condition, and visually display by means of enlarged projected images differing conditions indicative of the particular refractive characteristics of such lenses both through the centers thereof as well as through various other parts of the lenses outwardly thereof, as desired.

Thus, by use of the novel apparatus of the present invention and by observing the images projected through different parts of the same lens thereby, such as through the center and through edge portions thereof, it is an easy matter to visually compare and evaluate the refractive conditions of such a lens. Likewise, it is an easy matter to visually compare and evalute such a lens and other lenses of the same series relative to each other or relative to the lenses of a different lens series.

In a broad sense, the demonstration apparatus of the present invention comprises a slide projector, or the like, including means for supporting a suitable test chart in the illumination beam thereof, an objective for directing an image of said test chart onto a viewing screen in spaced aligned relation therewith, and means associated with the beam of the projector for demonstrating the refractive characteristics of a lens. This means comprises a supporting frame carried by the housing of the projector and said frame is provided with a forwardly extending part having an aperture stop formed therein which is of such size as to allow only paraxial and near paraxial rays from said test chart to be projected therethrough and imaged upon the viewing screen. This means also includes a laterally swingable head connected by vertically disposed pivot means to said forwardly extending frame part in such a manner that a conventional full size uncut unedged ophthalmic lens may be readily operatively positioned against suitably shaped forward face of said head of like size, and at such time have its ocular vertex well centered relative to and disposed substantially at a desired distance from a fixed axial point or location upon the optical axis of the projector objective. In fact, this axial point or location is established by the point of intersection of the axis of said pivot means with the optical axis of said projector, and the desired distance from said ocular vertex to said axial point or location should be pre-arranged to be approximately equal to the most typical distance ordinarily encountered as the center-of-rotation to ocular vertex distance of lenses for persons requiring corrective ophthalmic lenses. This distance, under varying circumstances, has been found to vary from approximately 24 mm. to 33 mm., with the most typical value lying between approximately 29½ mm. and 31½ mm. This is especially true when various different lateral and vertical angles of view are being considered. Therefore, the lens demonstration apparatus of the present invention could advantageously be given any desired value within this wide range of distances; and such value would undoubtedly be specified in accordance with the lens designer's particular requirements. Also, the swingable head is so constructed and arranged that it provides a preselected pantascopic angle for the lens being demonstrated for all lateral positions of adjustment thereof.

Ophthalmic lenses are each usually designed to yield a desired prescriptive power at the optical center thereof when viewed or measured from a given spaced position on the optical axis of the lens corresponding to the center-of-rotation distance to be used by the wearer of the lens. Variations at off-axis locations in such a lens design as supplied by different manufacturers of lens series result from the different combination of curves chosen by them to fulfill given prescriptive requirements. Some selected lens series yield designs which provide a minimum of astigmatism for oblique viewing for an infinite object distance while other lens designs provide a minimum of astigmatism for oblique viewing for near object distances, and may also attempt to simultaneously correct the meridional power errors of the lenses by certain amounts.

While such different lens series may vary considerably in certain parts thereof, nevertheless, heretofore, it has not been an easy matter to visually demonstrate any real merits of any one lens series design over those of another different lens series design. The present invention, however, is intended to make such demonstrations of refractive characteristics of such different lenses a relatively easy matter.

If the normal relation of a spectacle lens before the patient's eye is considered, it will be noted that his eye pivots about a point or, more exactly, a set of closely related points, which depend upon such factors as different angles of viewing of the eye, the size of the eyeball of the patient, the general anatomy of the patient's face, and the ophthalmic frame design to be employed for supporting the spectacle lens before the patient's eye. Thus, the variations in center-of-rotation to ocular vertex distances for different persons has been found to provide an average value of between approximately 29½ to 31½ millimeters.

If one were to project an image through a spectacle lens and onto a viewing screen with the projection beam being successively at various different angles corresponding to different angles of viewing through said lens, the projector would be so successively positioned behind the lens as to project through a single axial point analogous to the center-of-rotation point within the eye. Conversely, it would be possible to have the projector held in a fixed position and arranged to move the spectacle lens laterally about a selected axial point of corresponding character and thereby obtain an equivalent set of image conditions upon the viewing screen. Ths is so since the mechanical and optical situations involved would be identical for both cases.

Accordingly, the apparatus of the present invention, while projecting a suitable test chart image from a film within a projector onto a fixed viewing screen disposed at a suitable projection distance therefrom, is provided with suitable means by which it is possible to laterally swingably move a supporting head and an uncut unedged ophthalmic lens together about a predetermined fixed axial point or location in such a way that the projected image on the viewing screen will demonstrate the refractive characteristics of different parts of the lens for the various different oblique angles of viewing therethrough. In fact, with the apparatus of the present invention, it is also possible to provide a pantoscopic angle of any suitable desired value, with the result that the projected image passes through the lens being tested slightly above the optical center thereof. Furthermore, the apparatus is such that it will allow various different amounts of vertical and/or horizontal decentration of the lens with respect to the principal axis of the projection system when desired.

While it is possible to provide demonstration apparatus embodying the present invention in the form of a structure including a housing, an objective, film-supporting means within the housing and illumination means therefor together with means for suitably positioning a lens in various different positions of lateral adjustment relative to a fixed axial point or location in the projection beam corresponding to the center-of-rotation point within a patient's eye, while projecting a test chart image therethrough and onto a viewing screen, it is also possible to accomplish like results by the use of a readily detachable device arranged for use with a conventional slide projector or the like and with said device provided with means for establishing a fixed axial point or location in the projection beam and means for readily receiving and swingably moving a lens laterally about this point for demonstration purposes.

The structure of the present invention, whether in the form of a unitary structure for demonstrating lens characteristics or in the form of a detachable device for use with a conventional projector for such purposes, may include auxiliary lens supporting means which is useable when spectacle ophthalmic lenses of relatively high positive or negative powers are required for demonstration purposes.

It is, accordingly, a principal object of the present invention to provide in combination with suitable image-projecting means, means for readily positioning an ophthalmic lens relative to a fixed axial point or location in the projection beam thereof and means for enabling the lens to be moved about said point and laterally relative to said projection beam various different angular amounts in such a manner as to demonstrate on an associated viewing screen refractive characteristics of different parts of an ophthalmic lens or the like.

It is also an object of the invention to provide suitable readily detachable means for use with a conventional slide projector or the like whereby such various different refractive characteristics of an ophthalmic lens may be similarly demonstrated.

Other objects and advantages of the invention will become apparent from the detailed description which follows when taken in conjunction with the accompanying drawings in which:

FIG. 1 is a partial side elevational view of a projector and associated means, partly broken away, for showing apparatus embodying the present invention;

FIG. 2 is a plan view thereof; and

FIG. 3 is an enlarged view of a test chart image such as might be used with said apparatus.

Referring to the drawings in detail and in particular FIG. 1, it will be seen that the numeral 10 indicates generally a forward part of a conventional slide or strip film projector having a housing 11 and an objective 12 mounted therein. The objective, of course, is axially adjusted in usual fashion for focusing upon a film or the like 14 supported by film-supporting means 16 and suitably positioned at a focal plane within said projector and relative to said objective. Thus, an enlarged image of information contained upon said film, such as at 17, may be projected onto a viewing screen 18 spaced in the usual manner therefrom. The optical axis of the objective, it will be seen, is indicated by the numeral 20, and an enlarged image of this information as projected upon the viewing screen might look like the test chart image indicated at 17' in FIG. 3.

Detachably supported upon a front upper corner portion of the projector housing 11, by means of a set screw 21, or the like, is a main supporting frame 22. This supporting frame, as shown also in FIG. 2, comprises a rear cross bar 23 which is shaped to fit said front upper corner and carries the set screw 21 as well as a pair of forwardly extending rigid bent bars 24 and 25. The forwardly extending end portions of these bars are, in turn, secured to a transversely arranged hollowed-out bar-like member 26, and in the forward wall portion 27 of this member is centrally located an aperture stop 28. As will be appreciated from FIGS. 1 and 2, aperture stop 28 is so located in member 26 that the optical axis 20 of the objective extends centrally therethrough.

In upper and lower parts of bar-like member 26 are disposed a pair of aligned pivot pins 29 and 30 and, as shown in FIG. 1, same have a common vertically disposed axis 32. Axis 32, it will be noted, intersects the optical axis 20 at a fixed axial point or location 34 and, in fact, same serves as a point approximately analogous to the center-of-rotation point within a patient's eye when an ophthalmic lens is being demonstrated. Pivot means 29 and 30 are arranged to laterally swingably support a head 36 carried by a pair of arm-like members 38 and 40 in such a manner that an ordinary uncut unedged ophthalmic lens, such as indicated at 42, positioned against the front surface of head 36 may be swung laterally various different angular amounts relative to optical axis 20. While a flat front surface has been shown on head 36 other suitable shapes are acceptable as long as an adequate support is provided the lens with its ocular vertex disposed in a substantially fixed location. (A convex curvature near the base curve value of the lens, for example, could be used.) The distance to the point 34 will vary slightly, depending upon the degree of curvature of the lens being tested, but this is only slight and analogous to the fitting situations often encountered wherein lenses of varying curvatures are fitted to spectacle frames having flat eyewires with the result that some variation in total distance to the center-of-rotation of the eye likewise occurs.

Since head 36 is preferably, but not always, of substantially the same size as the uncut lens 42, it follows that the ocular vertex 43 of the lens will be at such times substantially constantly disposed at a more or less fixed distance from the previously mentioned axial point 34. Since point 34 is intended to be analogous to the center-of-rotation point of the eye, the distance from point 34 to the ocular vertex point 43 this distance has been made to equal that desired for most patients, and is of a value between approximately 29½ and 31½ mm.

In the arrangement shown in FIG. 1, arms 38 and 40 have purposely been made to be of different lengths so that the supporting head 36 will be downwardly tipped at a desired pantoscopic angle $\phi$ (the angle employed with ophthalmic frames between the plane of the eye wire and the temple) and here has been taken to be of approximately 10½ degrees downwardly relative to the optical axis 20. Of course, it should be noted that, nevertheless, the distance from the ocular vertex 43 to the fixed axial location 34 is still unchanged and corresponds to a distance of between 29½ and 31½ millimeters. (However, as stated previously, longer and shorter values could as easily be used to suit the purposes of a particular lens design.)

When desired, it is possible to provide means for controlling the amounts of lateral adjustment of the swingable head 36 and, in the structure shown in FIG. 2, it will be seen that two series of holes 45 and 46 are indicated in bar-like member 26 at opposite sides of the pivot means 29, and removable pins 48 and 49 may be employed for limiting the amounts of angular adjustment of the head for each different test to be performed. Such holes, of course, may be arranged to indicate different specific amounts of angular adjustment of the head, as, for example, 20, 30 and 40 degrees and the innermost hole on each side would be arranged to restrain the head to a straight-forward position for the lens being demonstrated. Of course, other means for controlling such lateral adjustment of the head and lens during use of the apparatus may be provided.

A rack arrangement for an auxiliary lens may be provided by a pair of inwardly facing side channels 50 and 51 and a centrally located lower pin 52 may serve to hold such auxiliary lens in axial alignment with the objective 12. Such an auxiliary lens ordinarily would only be used for compensating when the lens under test is of such strong positive or strong negative power as to exceed the focusing range of the projector objective, and, of course, the auxiliary lens will be of opposite sign and suitable power to work therewith in focusing the test chart image upon the viewing screen.

During use of the demonstration apparatus, an uncut lens which is usually circular in shape will be held so as to have its outer peripheral edge in coincidence with the similarly shaped edge of the swingable head of the apparatus. While the lens is so held and with the head of the apparatus rotated to its forward or zero position, the enlarged projected image of the test chart upon the viewing screen will be brought into exact focus by adjustment of the projector objective. Or, alternatively, if the lens to be demonstrated is of relatively strong positive or strong negative prescriptive power, a suitable auxiliary lens of opposite sign will be used in the projection beam as compensating means and thereafter the projected image will be brought into exact focus. Thereafter, the head and the lens to be tested will be moved together to different positions of lateral adjustment and, accordingly, may display upon the viewing screen differing amounts of off-axis aberrations such as blur in the image or change in the size or magnification of the image of the test chart. Thus, it is possible to readily project and observe the condition of the screen image when projecting through different parts of the same lens or conditions of such a lens with reference to other lenses of presumably like prescriptive specification but possibly displaying different refractive characteristics.

Having described my invention, I claim:

1. Apparatus for use in successively displaying by means of an enlarged projected image upon a viewing screen the refractive characteristics of different parts of any selected conventional ophthalmic lens, said apparatus comprising a projector having a housing, means for positioning a test chart, or the like, at a focal plane within said housing, an objective adjustably carrier by said housing for projecting an enlarged image of said test chart onto a viewing screen materially spaced from said projector, a supporting frame carried by said housing and having a part extending forwardly of the normal focusing range of said objective, pivot means carried by said forward part in such a manner as to have a pivotal axis vertically disposed and intersecting the optical axis of said objective substantially at a preselected axial point, an aperture stop carried by said forward part, the aperture of said aperture stop being disposed closely adjacent said preselected axial point and of such a size as to alloy substantially only paraxial and near paraxial rays of the projected beam to pass therethrough when said objective is focused upon said test chart and is projecting said enlarged image thereof onto said viewing screen, a head carried by said pivot means forwardly of said preselected axial point and pivotable laterally thereabout to various different lens testing positions to either side of said optical axis corresponding to different ordinary angular viewing directions through the lens, and a lens-supporting surface on the forward side of said head of such size as to conveniently receive and support any ordinary ophthalmic lens held in centered contacting relation therewith, said lens-supporting surface having an opening formed therein of at least such size as to permit the paraxial and near paraxial rays which have passed through said aperture to also pass through said opening for all lens testing positions of said head, said lens-supporting surface being so spaced forwardly of said preselected axial point as to locate the ocular vertex of said ophthalmic lens positioned in contact with said lens-supporting surface for test purposes substantially at a predetermined center-of-rotation-to-ocular vertex distance from said axial point.

2. Apparatus as defined in claim 1 in which said lens-supporting surface on said head is disposed at such a downwardly tilted angle relative to the optical axis of said objective as to be substantially equal to the pantoscopic angle to be used with said lens when same is positioned for use in an ophthalmic frame.

3. Apparatus as defined in claim 1 in which means is provided upon said supporting frame forwardly of the normal range of focusing adjustment of said objective for holding an auxiliary lens in alignment with said objective for compensation purposes when a strong lens of opposite power to that of said auxiliary lens is to be displayed in said apparatus.

4. Apparatus as defined in claim 1 in which means is provided for detachably securing said supporting frame to said projector housing.

5. Apparatus as defined in claim 4 in which said lens-supporting surface on said head is disposed at such an angle relative to the optical axis of said objective as to be substantially equal to the pantoscopic angle to be used with said lens when same is positioned for use in an ophthalmic frame.

6. Apparatus as defined in claim 4 in which means is provided upon said supporting frame forwardly of the normal range of focusing adjustment of said objective for holding an auxiliary lens in alignment with said objective for compensation purposes when a strong lens of opposite power to that of said auxiliary lens is to be demonstrated in said apparatus.

References Cited

UNITED STATES PATENTS

| 2,114,282 | 4/1938 | Ames et al. | 88—56 |
| 2,683,392 | 7/1954 | Ellis | 88—56 |
| 2,746,345 | 5/1956 | Graves. | |
| 2,940,371 | 6/1960 | Thurow. | |

FOREIGN PATENTS

| 907,358 | 3/1954 | Germany. |

RONALD L. WIBERT, Primary Examiner

J. ROTHENBERG, Assistant Examiner

U.S. Cl. X.R.

353—101